(12) United States Patent
Ganguly et al.

(10) Patent No.: US 9,380,239 B2
(45) Date of Patent: Jun. 28, 2016

(54) PIXEL CIRCUIT WITH CONSTANT VOLTAGE BIASED PHOTODIODE AND RELATED IMAGING METHOD

(71) Applicant: VARIAN MEDICAL SYSTEMS, INC., Palo Alto, CA (US)

(72) Inventors: Arundhuti Ganguly, San Jose, CA (US); Pieter Gerhard Roos, Sandy, UT (US)

(73) Assignee: VARIAN MEDICAL SYSTEMS, INC., Palo Alto, CA (US)

( * ) Notice: Subject to any disclaimer, the term of this patent is extended or adjusted under 35 U.S.C. 154(b) by 0 days.

(21) Appl. No.: 14/418,955

(22) PCT Filed: Sep. 11, 2014

(86) PCT No.: PCT/US2014/055088
§ 371 (c)(1),
(2) Date: Feb. 2, 2015

(87) PCT Pub. No.: WO2015/038709
PCT Pub. Date: Mar. 19, 2015

(65) Prior Publication Data
US 2016/0028984 A1     Jan. 28, 2016

Related U.S. Application Data

(60) Provisional application No. 61/876,226, filed on Sep. 11, 2013.

(51) Int. Cl.
*H04N 5/3745* (2011.01)
*H04N 5/355* (2011.01)
*H04N 5/359* (2011.01)

(52) U.S. Cl.
CPC ............. *H04N 5/3745* (2013.01); *H04N 5/359* (2013.01); *H04N 5/35563* (2013.01)

(58) Field of Classification Search
CPC . H04N 5/3745; H04N 5/359; H04N 5/35563; H04N 5/355; H04N 5/374; H04N 3/14; H04N 9/64; H01L 27/146; H01L 31/09; H01L 33/00
See application file for complete search history.

(56) References Cited

U.S. PATENT DOCUMENTS

| 7,924,332 B2 | 4/2011 | Gruev et al. |
| 2007/0046800 A1 | 3/2007 | Chen et al. |

(Continued)

FOREIGN PATENT DOCUMENTS

| JP | 2005295346 A | 10/2005 |
| KR | 100847742 B1 | 7/2008 |

OTHER PUBLICATIONS

International Search Report and Written Opinion of the International Searching Authority, International application No. PCT/US2014/055088, Dec. 5, 2014.
Steve Utrup et al., "Design and Performance of a 32 Slice CT Detector System using Back Illuminated Photodiodes", Proceedings of SPIE, Physics of Medical Imaging, 2004, pp. 40-51, vol. 5368.

(Continued)

*Primary Examiner* — Aung S Moe
(74) *Attorney, Agent, or Firm* — SU IP Consulting

(57) ABSTRACT

An imaging system includes a plurality of pixel circuits each having a photodiode, a biasing circuit and a charge-to-voltage converter. The photodiode is configured to generate charges in response to light or radiation. The biasing circuit is configured to provide a constant bias voltage across the photodiode so as to drain the charges generated by the photodiode. The charge-to-voltage converter is configured to accumulate the charges drained by the biasing circuit and convert the accumulated charges into a corresponding output voltage.

14 Claims, 6 Drawing Sheets

(56) References Cited

U.S. PATENT DOCUMENTS

| | | | |
|---|---|---|---|
| 2008/0135895 A1* | 6/2008 | Lee | H04N 3/155 257/290 |
| 2009/0219410 A1* | 9/2009 | Hsu | H04N 5/363 348/229.1 |
| 2011/0108704 A1 | 5/2011 | Kim et al. | |
| 2012/0280112 A1* | 11/2012 | Collins | H04N 5/3535 250/208.1 |

OTHER PUBLICATIONS

Randy Luhta et al., "Back Illuminated Photodiodes for Multislice CT", Proceedings of SPIE, Physics of Medical Imaging, 2003, pp. 235-245, vol. 5030.

Edgar Sanchez-Sinencio et al., "Low-Voltage/ Low-Power Integrated Circuits and Systems", IEEE Press through Wiley Interscience, 1998, pp. 102-105.

\* cited by examiner

PIXEL CIRCUIT WITH CONSTANT VOLTAGE BIASED PHOTODIODE AND RELATED IMAGING METHOD

CROSS-REFERENCE TO RELATED APPLICATIONS

The present application is a U.S. National Stage filing under 35 U.S.C. §371 of International Application PCT/US2014/055088, filed Sep. 11, 2014 and entitled "PIXEL CIRCUIT WITH CONSTANT VOLTAGE BIASED PHOTODIODE AND RELATED IMAGING METHOD." The International application claims the benefit of U.S. Provisional Application No. 61/876,226 filed Sep. 11, 2013. The aforementioned U.S. Provisional Application and International Application, including any appendices or attachments thereof, are hereby incorporated by reference in their entirety.

BACKGROUND

Unless otherwise indicated herein, the approaches described in this section are not prior art to the claims in this application and are not admitted to be prior art by inclusion in this section.

Conventional imagers use photodiodes that are light sensitive electronic elements which convert incident light to either current or voltage. The signal from a matrix of such photodiode elements or pixels creates the image. Photodiodes are typically operated in a "charge depletion" mode. In this mode, a capacitor associated with the photodiode in each pixel circuit is pre-charged to 1V-6V reverse bias (or voltage) before light exposure or image acquisition. For instance, the cathode is at a higher voltage level than the anode (the cathode and anode being the two oppositely charged electrodes in a photodiode). A very low leakage current flow is possible between these two terminals. Leakage current is the flow of charge in the "off" state of the device and is an undesirable effect. In the charge depletion mode, the photo current generated by image information would passively deplete or remove the charges stored in the reverse bias, so that the voltage across the photodiode gradually drops as it absorbs light projected by the incoming image.

In some prior art passive pixel circuits, the readout action may restore the photodiode reverse bias to the pre-exposure level and measure the amount of charges required to restore this bias. In some prior art active pixel circuits, the voltage left on the photodiode is measured at the end of the exposure. The photodiode reverse bias is then restored by a separate reset action.

The above mentioned prior art approaches have at least the following limitations: (1) the photodiode leakage current may also deplete the stored reverse bias, thus introducing a type of noise known as shot noise and dynamic range limits; (2) the photodiode responsivity may change with its bias voltage, which may be depleted with increased signal integration, thus introducing undesirable non-linearity; (3) in many active pixel designs, the accumulated signal charge is represented by the voltage across the photodiode capacitance which is a function of the voltage, thereby introducing undesirable non-linearity; and (4) the bias restoration action of the photodiode capacitance may introduce kTC noise (also known as reset noise).

DETAILED DESCRIPTION

Figure 1:
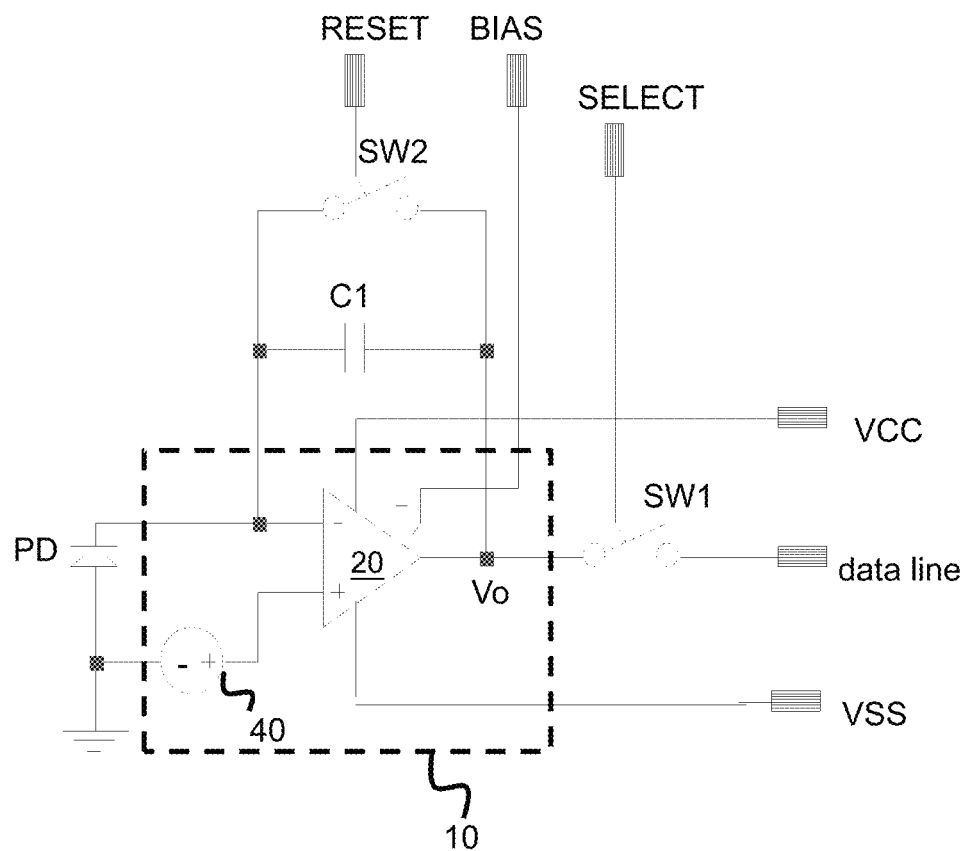
FIG. 1 is a schematic diagram of one example pixel circuit in an imaging system.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

Throughout this description, the distinction between the bias voltage across the photodiode (i.e., the potential difference preset or maintained across the photodiode cathode and anode terminals) and the bias current operating in the pixels circuit should be noted. Bias voltage is applied to the photodiodes to enable their ability to integrate optical signal through charge depletion. Bias current is applied in active units in pixel circuits to ensure optimal, linear, and low noise operations of the pixel circuits.

FIGS. 1, 2, 3, and 4 are schematic diagrams of pixel circuits 101, 102, 103, and 104, respectively, in an imaging system, in accordance with at least some embodiments of the present disclosure. Each of the pixel circuits 101, 102, 103, and 104 includes a photo diode PD, a biasing circuit 10, a charge-to-voltage converter C1, and switches SW1 and SW2. The pixel circuits 101, 102, 103, and 104 may be configured to operate based on control signals RESET, BIAS, and SELECT, which will be explained in detail in subsequent paragraphs. VCC and VSS represent the bias voltages supplied to the biasing circuit 10 to ensure proper operations.

The operations of the pixel circuits 101, 102, 103, and 104 may include at least three stages: image acquisition period, readout period, and reset period. The biasing circuit 10 is configured to provide a constant bias voltage across the photodiode PD during the entire operation, so that the pixel circuits 101, 102, 103, and 104 may operate in a "charge generation" mode. During the image acquisition period, the photodiode PD may be configured to generate charges in response to incoming light or radiation. In the "charge generation" mode, the charges generated by the photodiode PD in response to light or radiation are drained by the biasing circuit 10 and are accumulated in the charge-to-voltage converter C1. As previously stated, a prior art pixel circuit is configured to operate in the "charge depletion" mode in which the photodiode responsivity may change with bias voltage, thus introducing undesirable non-linearity. In the present disclosure, since the bias voltage across the photodiode PD is not be allowed to be modulated by incoming light or radiation, the photodiode responsivity is not a function of the amount of signal already captured, and linearity of signal response can thus be maintained.

In the embodiments illustrated in FIGS. 1, 2, 3, and 4, the charge-to-voltage converter C1 may be, but not limited to, a linear parallel plate capacitor, or another type of device having similar function. During the image acquisition period, the charge-to-voltage converter C1 may be configured to receive the charges drained from the photodiode PD at a first end, accumulate the received charges, and convert the accumulated charges into an output voltage Vo at a second end. During the readout period, the output voltage Vo may be transmitted to a corresponding data line in the imaging system via the switch SW1 for acquiring corresponding video signals, which will be described in detail in subsequent paragraphs. During the reset period, the charge-to-voltage converter C1 may be reset using the switch SW2 for clearing the accumulated charges, thereby ready for the subsequent image acquisition period.

As previously stated, the charges generated due to light or radiation in a prior art active pixel circuit is accumulated in the photodiode capacitance, which is a function of the varying bias voltage, thereby introducing undesirable non-linearity. In the present disclosure, the charges generated due to light or radiation is accumulated in the charge-to-voltage converter C1 instead of in the photodiode capacitance. Since the gain of the charge-to-voltage converter C1 (the ratio of input charge to output voltage) is a constant value which is independent of any incoming light or radiation, linear representation of the incoming light or radiation can be provided by direct readout of the output voltage Vo at the second end of the charge-to-voltage converter C1.

It should be noted that when operating in the "charge generation" mode, no bias restoration action needs to be performed on the photodiode PD in a switched manner. Therefore, the pixel circuits 101, 102, 103, and 104 in accordance with at least some embodiments of the present disclosure do not generate much kTC noise, as would be the drawback of conventional pixel circuits.

Figure 3:
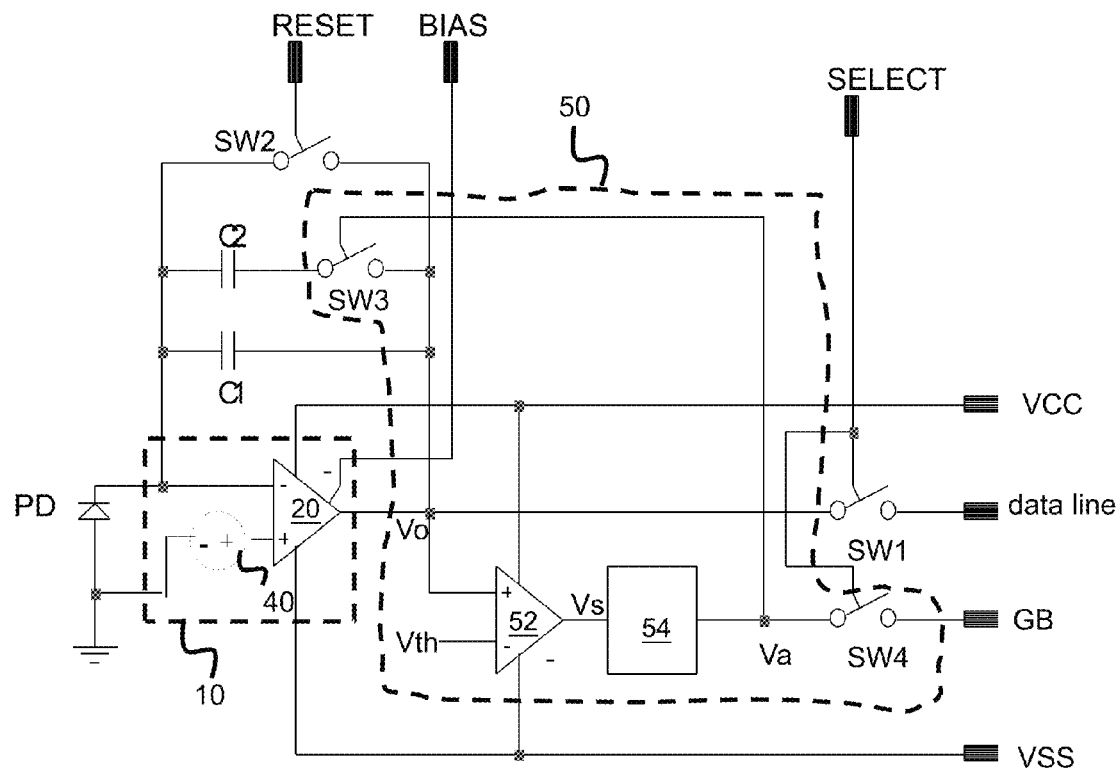
FIG. 3 is a schematic diagram of another example pixel circuit in an imaging system.

In the embodiments illustrated in FIGS. 1 and 3, the biasing circuit 10 of the pixel circuit 101 or 103 includes an operational amplifier 20 and a voltage source 40. The voltage source 40 is coupled between the non-inverting end of the operational amplifier 20 and the anode of the photo diode PD. The charge-to-voltage converter C1 is coupled between the inverting end and the output end of the operational amplifier 20. The constant bias voltage provided across the photodiode PD is determined by the voltage source 40. The operational amplifier 20 may present a virtual ground node to the photodiode PD, at its inverting input, thus holding that virtual ground node at the same voltage as its non-inverting input. All photo generated charge will be pulled through to the charge-to-voltage converter C1, where it may result in the output voltage Vo that is linearly proportional to the integrated amount of charge that the photodiode PD generated from incoming light signal. However, these photo induced charges do not change the voltage across the photodiode PD, as would be the cause of non-linearity in conventional pixel circuits.

Figure 2:
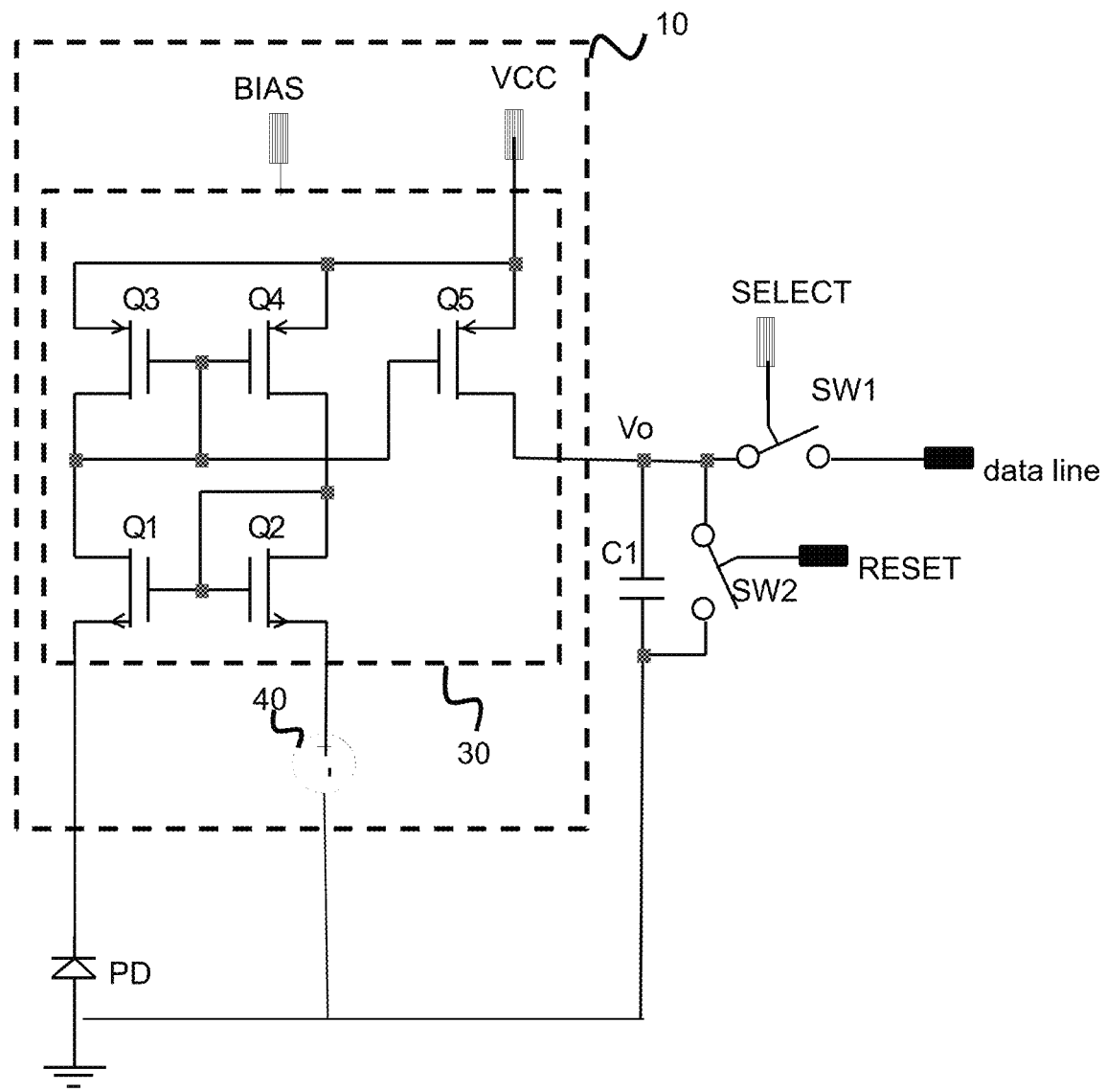
FIG. 2 is a schematic diagram of another example pixel circuit in an imaging system.
Figure 4:
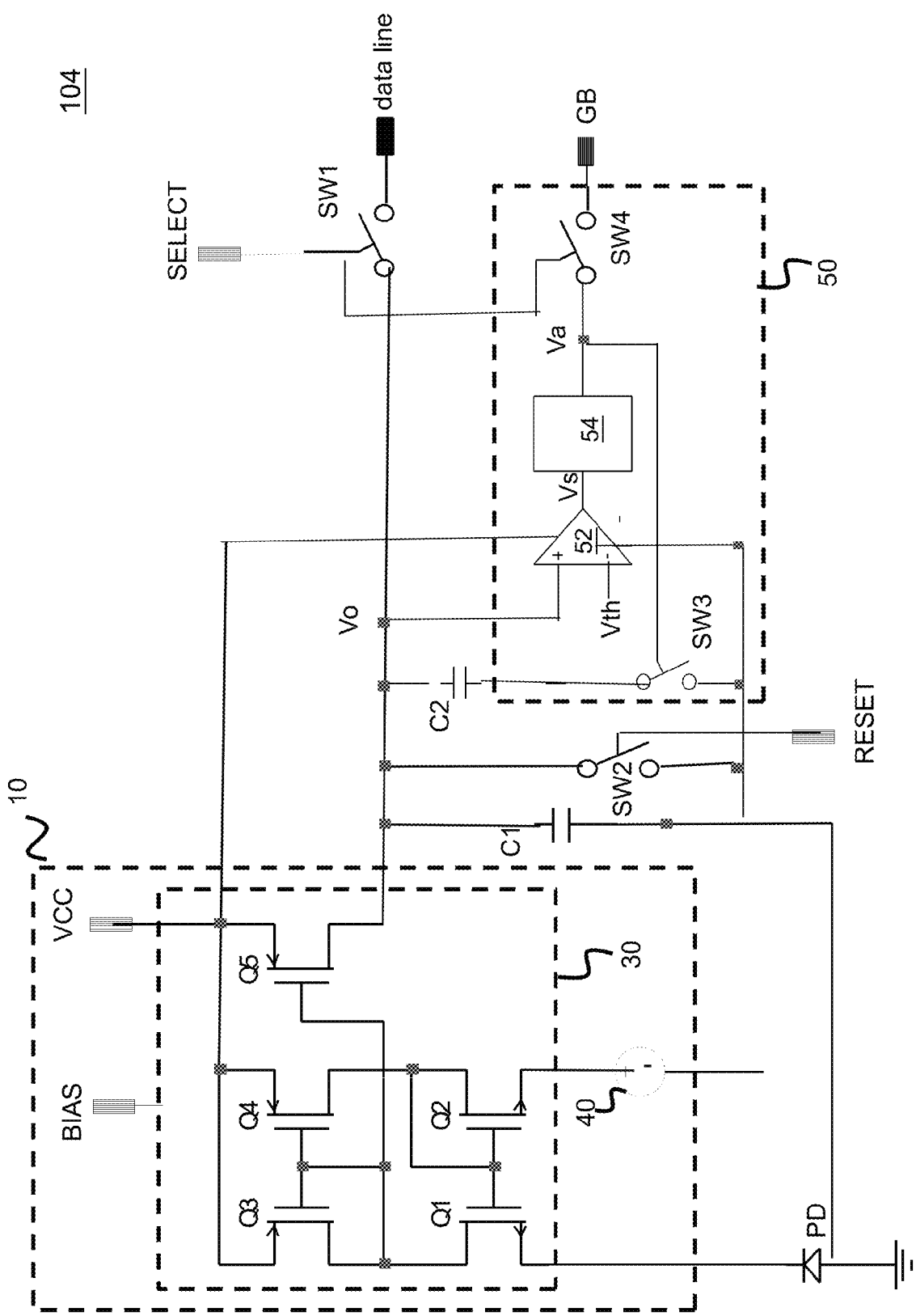
FIG. 4 is a schematic diagram of yet another example pixel circuit in an imaging system.

In the embodiments illustrated in FIGS. 2 and 4, the biasing circuit 10 of the pixel circuit 102 or 104 includes a current commuter circuit 30 and a voltage source 40. The current commuter circuit 30 includes transistors Q1, Q2, Q3, Q4, and Q5, which may be metal-oxide-semiconductor field-effect transistors (MOSFETs), bipolar junction transistors (BJTs) or other devices having similar functions. The cathode of the photo diode PD is coupled to a first end of the current commuter circuit 30. The voltage source 40 is coupled between a second end of the current commuter circuit 30 and the anode of the photo diode PD. The charge-to-voltage converter C1 is coupled between a third end of the current commuter circuit 30 and the anode of the photo diode PD. The constant bias voltage provided across the photodiode PD is determined by the voltage source 40. It should be noted that the current commuter circuit 30 in the pixel circuits 102 and 104 may generate less electronic noises than an operational amplifier.

As previously stated, leakage current limits the length of time that a conventional pixel circuit can be kept in the image integration mode since it depletes the initial bias charge stored on the photodiode. Leakage current also results in shot noise which limits the low signal detection capability of a conventional pixel circuit. In accordance with some embodiments of the present disclosure, the voltage source 40 in the biasing circuit 10 is configured to provide a bias voltage of 0V so that no leakage current can be generated in the photo diode PD. As a result, in addition to providing better linearity, the pixel circuits 101, 102, 103, and 104 with zero-biased photodiodes may have long operating time and low shot noise.

In the example embodiments illustrated in FIGS. 1, 2, 3, and 4, the biasing circuit 10 is configured to operate in a first mode during the image acquisition period and in a second mode during the readout period and the reset period. The biasing circuit 10 may switch between the first mode and the second mode based on the bias signal BIAS. In the first mode, the internal bias current of the biasing circuit 10 is modulated to the smallest value which is sufficient to drain the charges from the photodiode PD and maintain the constant bias voltage across the photodiode PD. In the second mode, the internal bias current of the biasing circuit 10 is modulated to a higher value (as much as 100 times of its smallest value) for noise reduction and to provide sufficient drive strength to send the output voltage Vo, at good integrity, to the data line. Therefore, power consumption may be reduced by modulating the internal bias current of the biasing circuit 10, especially when the pixel circuits 101, 102, 103, and 104 are implemented in an active/passive monolithic imaging system with high pixel counts.

In the example embodiments illustrated in FIGS. 3 and 4, each of the pixel circuits 103 and 104 further includes a gain-switching circuit 50 and a charge-to-voltage converter C2. The gain-switching circuit 50 includes a voltage comparator 52 and a select circuit having a latch 54 and switches SW3 and SW4. The voltage comparator 52 is configured to generate a select signal Vs according to the difference between the output voltage Vo and a threshold voltage Vth. The latch 54 is configured to generate a latch signal Va associated with the logic level of the select signal Vs. The charge-to-voltage converter C2, whose gain is higher than that of the charge-to-voltage converter C1, is selectively coupled in parallel with the charge-to-voltage converter C1 via the switch SW3 based on the latch signal Va. The charge-to-voltage converter C2 may be, but not limited to, a linear parallel plate capacitor, or another type of device having similar function.

If the overall charge-to-voltage conversion ratio of the pixel circuit 103 or 104 is made as small as possible to achieve the best signal-to noise ratio, the amount of signal charge which can be handled would be lowered. In accordance with at least some embodiments of the present disclosure, the gain of the charge-to-voltage converter C1 may be chosen to be as small as possible to provide the highest possible conversion efficiency, while the gain of the charge-to-voltage converter C2 may be chosen to be significantly larger than that of the charge-to-voltage converter C1 (typically 4 or 16 times larger) to handle a much larger amount of signal charge. At the start of each frame, the switch SW3 in the select circuit is turned off (open-circuited), and the overall charge-to-voltage conversion ratio of the pixel circuit 103 or 104 is thus determined by the gain of the charge-to-voltage converter C1 alone. Under such circumstance, the pixel circuit 103 or 104 may improve the charge-to-voltage conversion efficiency and the signal-to-noise ratio.

As previously stated, the output voltage Vo provided by the charge-to-voltage converter C1 is proportional to the charges generated by and drained from the photodiode PD, and the select signal Vs provided by the voltage comparator 52 is proportional to the difference between the output voltage Vo and the threshold voltage Vth. If the photodiode PD is exposed to low level of light or radiation, the charges accumulated in the charge-to-voltage converter C1 may result in the output voltage Vo which does not exceed the threshold voltage Vth. At this moment, the select signal Vs generated by the voltage comparator 52 is at a logic low level and the corresponding latch signal Va generated by the latch 54 in the select circuit keeps the switch SW3 in the "off" state. Therefore, the overall charge-to-voltage conversion ratio of the pixel circuit 103 or 104 is still determined by the gain of the charge-to-voltage converter C1 alone, thereby improving the charge-to-voltage conversion efficiency and the signal-to-noise ratio.

If the photodiode PD is exposed to high level of light or radiation, the charges accumulated in the charge-to-voltage converter C1 may be sufficiently large so that the output voltage Vo increases rapidly until it exceeds the threshold voltage Vth. Under this condition, the select signal Vs generated by the voltage comparator 52 is at a logic high level, and the corresponding latch signal Va generated by the latch 54 in the select circuit turns the switch SW3 on (short-circuited), thereby allowing the charge-to-voltage converter C2 to be coupled in parallel with the charge-to-voltage converter C1. Therefore, the overall charge-to-voltage conversion ratio of the pixel circuit 103 or 104 may now be determined by both the gain of the charge-to-voltage converter C1 and the gain of the charge-to-voltage converter C2, thereby allowing the pixel circuit 103 or 104 to integrate much larger amounts of signal charge.

In this way, dark (low level of light or radiation) regions in an image may be captured with high gain and low additive noise, while bright (high level of light or radiation) regions are captured with high signal capacity. Pixel data captured at low gain, may be flagged by the latch output as a gain bit value GB, which is multiplexed out in parallel with the output voltage Vo (by controlling the switches SW1 and SW4). A subsequent image processing computer (not shown) may then digitally multiply the representative digital value for that pixel, with a calibrated gain ratio for that pixel, to restore linear signal values for all pixels, but with much larger dynamic range than is possible with fixed gain designs in prior art pixel circuits.

Figure 5:
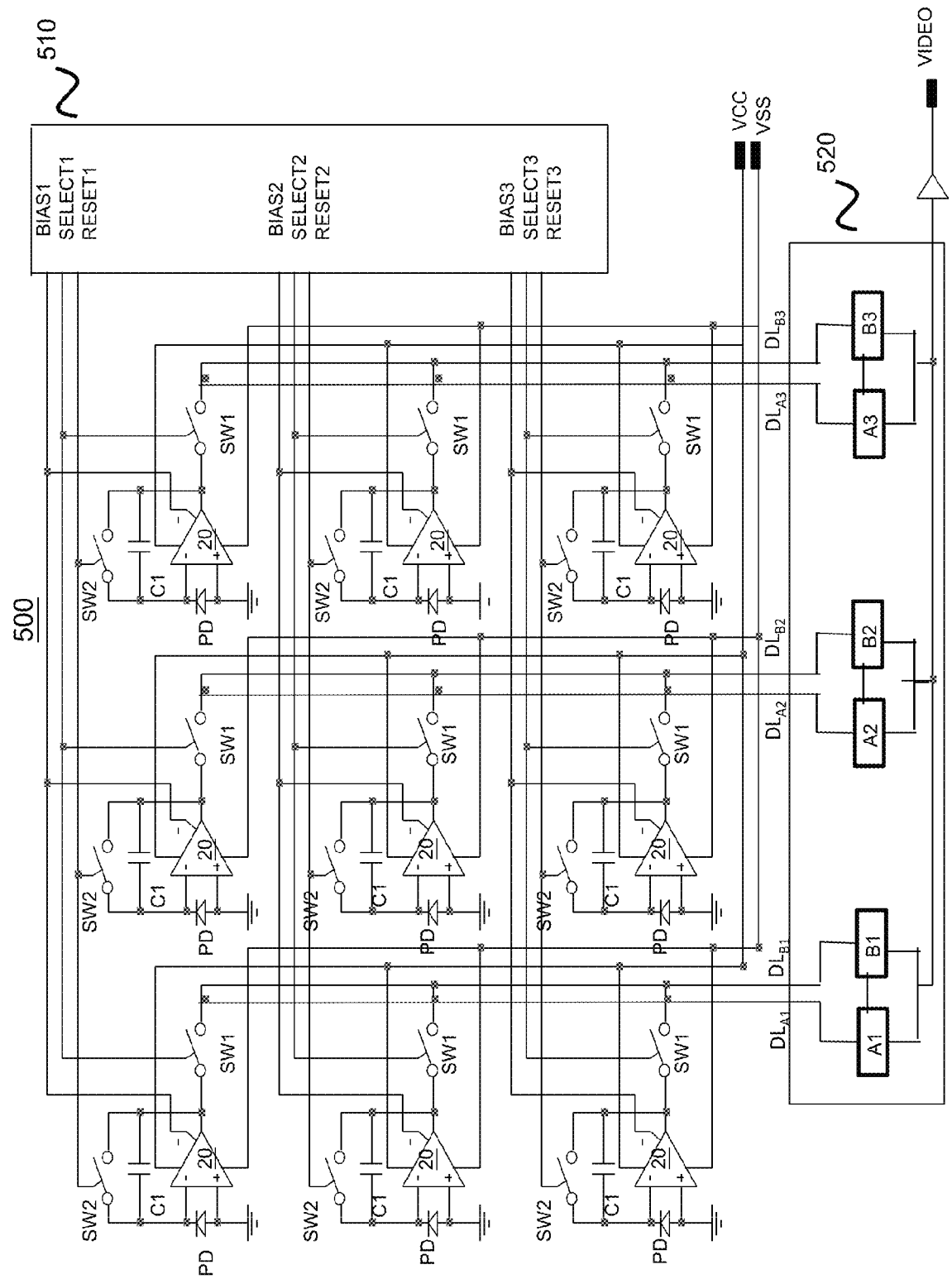
FIG. 5 is a schematic diagram of an imaging system, which is implemented with the pixel circuit illustrated in FIG. 1.

FIG. 5 is a schematic diagram of an imaging system 500 which is implemented with the pixel circuit 101 of FIG. 1, in accordance with at least some embodiments of the present disclosure. The imaging system 500 may be arranged as an M×N pixel imager array, wherein M and N are positive integers. FIG. 5 depicts an embodiment when M=N=3 for illustrative purpose. Although the pixel circuit 101 is used for illustration, each of the pixel circuits 102, 103, and 104 may also be implemented in an imaging system in the same manner.

The imaging system 500 also includes a row control circuit 510 and a column readout circuit 520. The row control circuit 510 is configured to generate control signals for operating corresponding pixel circuits 101, including bias signals BIAS1, BIAS2, and BIAS3, select signals SELECT1, SELECT2, and SELECT3, and reset signals RESET1, RESET2, and RESET3. The bias signals BIAS1, BIAS2, and BIAS3 are used to modulate the bias current of the operational amplifiers 20 in the first, second, and third rows of the pixel circuit 101, respectively. The select signals SELECT1, SELECT2, and SELECT3 are used to turn on the switches SW1 in the first, second, and third rows of the pixel circuit 101, respectively, so that the output signal Vo of a corresponding row may be transmitted to the column readout circuit 520. The reset signals RESET1, RESET2, and RESET3 are used to turn on the switches SW2 in the first, second, and third rows of the pixel circuit 101, respectively, so as to clear the charges accumulated in the charge-to-voltage converters C1 of a corresponding row for the next image acquisition.

The column readout circuit 520 includes a first video processing circuit, a second video processing circuit, a plurality of signal data lines $DL_{A1}$, $DL_{A2}$, and $DL_{A3}$, and a plurality of reset data lines $DL_{B1}$, $DL_{B2}$, and $DL_{B3}$. The first video processing circuit includes video processing units A1, A2, and A3 each configured to process the output voltages Vo received from a corresponding column of the pixel circuit 101 via a corresponding signal data line. The second video processing circuit includes video processing unit B1, B2, and B3 each configured to process the output voltages Vo received from a corresponding column of the pixel circuit 101 via a corresponding reset data line. In the imaging system 500, two video processing circuits and two data lines are provided for a corresponding column of the pixel circuit 101. For example, when the switches SW1 in the first row of the pixel circuit 101 are turned on by the select signal SELECT1, the processing unit A1 may acquire a signal sample by latching the output voltage Vo via the signal data line $DL_{A1}$, and the processing unit B1 may acquire a reset sample by latching the output voltage Vo via the reset data line $DL_{B1}$.

In some embodiments, upon completion of image integration, the signal stored on each pixel circuit may be read out through the matrix data lines and the column readout circuit 520 to form a raster video signal VIDEO. Sequentially, typically on a matrix row-by-row basis, the in-pixel operational amplifiers 20 of that row may operate with an elevated bias current based on the corresponding bias signal, and the switches SW1 of that row may be turned on by the corresponding select signal. Thus, the output ends of the operational amplifiers 20 in that row may be connected, through the matrix data lines, to the column readout circuit 520. Immediately after capturing the signal sample from each data line, the reset signal for that row may be activated to clear the accumulated signal charge and prepare the pixel circuits for the next image integration phase.

Figure 6:
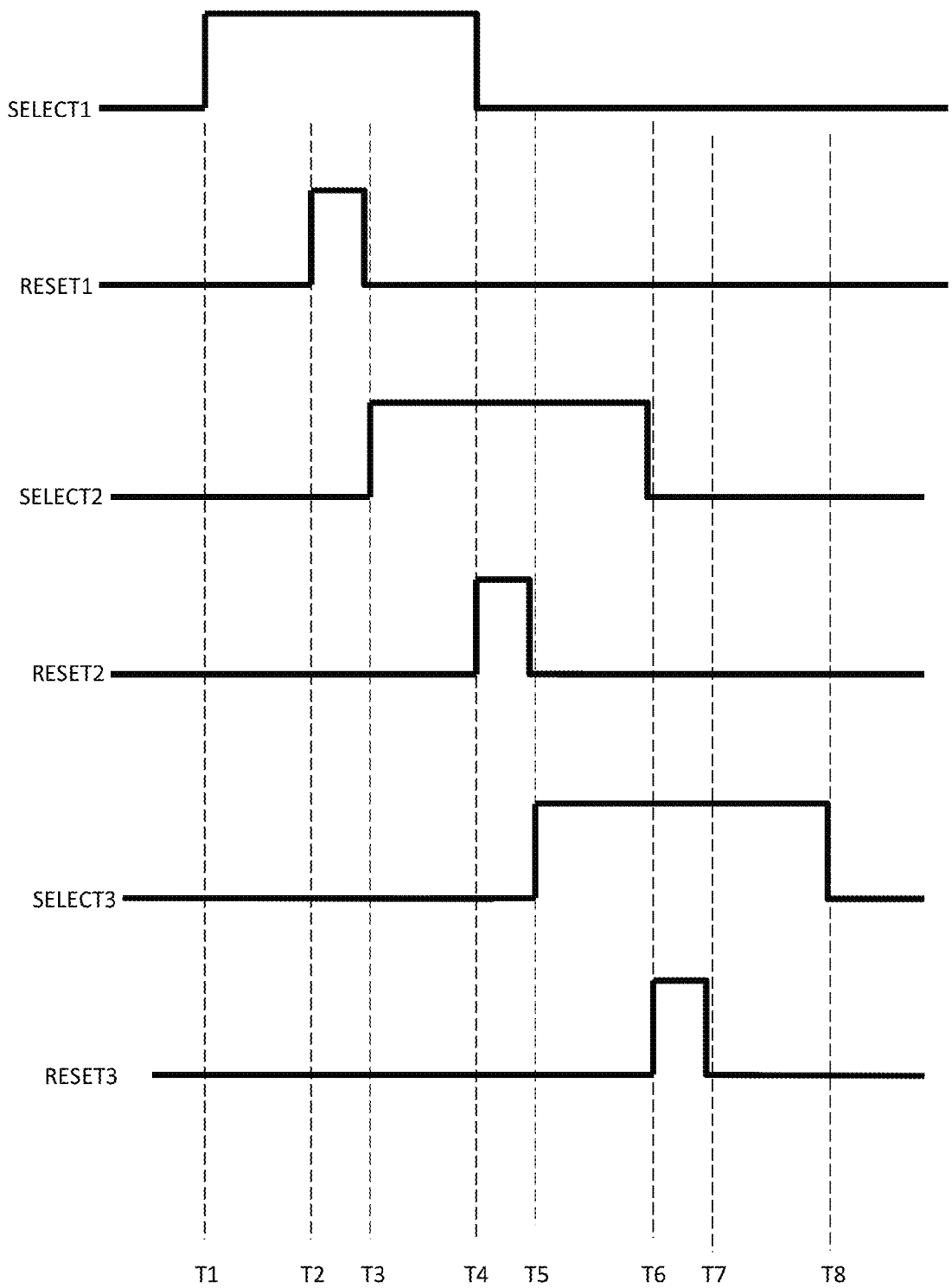
FIG. 6 is a timing diagram illustrating the operations of the imaging system of FIG. 5, all arranged in accordance with at least some embodiments of the present disclosure.

FIG. 6 is a timing diagram illustrating the operations of the imaging system 500 of FIG. 5, in accordance with at least some embodiments of the present disclosure. When the select signals SELECT1, SELECT2, and SELECT3 are active (represented by the high level in FIG. 6), the switches SW1 are turned on to allow the column readout circuit 520 to acquire the signal samples and the reset samples from corresponding pixel circuits. In some embodiments, the select signal for each row may be kept active for a sufficient time before and after the corresponding reset signal becomes inactive, to allow the video processing circuits A1, A2, and A3 to acquire the signal samples from corresponding pixel circuits before resetting the charge-to-voltage converters C1 and to allow the video processing circuits B1, B2, and B3 to acquire the reset samples from corresponding pixel circuits after resetting the charge-to-voltage converters C1. A reset sample acquired from a pixel circuit may be representative of the level to which the operational amplifiers 20 was reset, in preparation for the next image integration phase. This reset sample may then be stored for subtraction from the signal sample of the next image, thus performing correlated double sampling, to eliminate the reset noise of the operational amplifiers 20.

In some embodiments, this correlated double sampling process may be streamlined by designing the imaging system 500 with two data lines and two video processing circuits per column, such that the reset sample of one row and the signal sample of the next row can be read during the same period. For example, the reset sample of the first row and the signal sample of the second row may be acquired during T3 and T4 when both the select signals SELECT1 and SELECT2 are active. Similarly, the reset sample of the second row and the signal sample of the third row may be acquired during T5-T6 when both the select signals SELECT1 and SELECT2 are active.

In some embodiments, this correlated double sampling process may be streamlined by designing the imaging system 500 with two data lines and two video processing circuits per column, such that the reset sample of one row and the signal sample of the next row can be read simultaneously. For example, the reset sample of the first row and the signal sample of the second row may be acquired at the same time during T3 and T4 when both the select signals SELECT1 and SELECT2 are active. Similarly, the reset sample of the second row and the signal sample of the third row may be acquired at the same time during T5 and T6 when both the select signals SELECT1 and SELECT2 are active.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. An imaging system having a pixel array that includes a plurality of pixel circuits, each pixel circuit comprising:
    a photodiode configured to generate charges in response to light or radiation;
    a biasing circuit configured to provide a constant bias voltage across the photodiode so as to drain the charges generated by the photodiode; and
    a first charge-to-voltage converter configured to accumulate the charges drained by the biasing circuit and convert the accumulated charges into a corresponding output voltage.

2. The imaging system of claim 1, wherein the each pixel circuit further comprises:
    a gain-switching circuit configured to detect the output voltage and provide a second charge-to-voltage converter to accumulate the charges generated by the photodiode in response to the output voltage exceeding a threshold voltage.

3. The imaging system of claim 2, wherein:
    the gain-switching circuit comprises:
        a voltage comparator configured to generate a select signal according to a difference between the output voltage and the threshold voltage; and
        a select circuit configured to generate a latch signal associated with a logic level of the select signal; and
    the second charge-to-voltage converter is selectively coupled in parallel with the first charge-to-voltage converter based on the latch signal.

4. The imaging system of claim 1, wherein:
    the first charge-to-voltage converter comprises:
        a first end coupled to a cathode of the photodiode; and
        a second end for outputting the output voltage; and
    the biasing circuit comprises:
        an operational amplifier including:
            a non-inverting input end;
            an inverting input end coupled to the cathode of the photodiode; an output end coupled to the second end of the first charge-to-voltage converter; and
        a voltage source coupled between an anode of the photodiode and the non-inverting input end of the operational amplifier to provide the constant bias voltage.

5. The imaging system of claim 1, wherein:
    the first charge-to-voltage converter comprises:
        a first end coupled to an anode of the photodiode; and
        a second end for outputting the output voltage; and
    the biasing circuit comprises:
        a first transistor including:
            a first end coupled to a cathode of the photodiode;
            a second end; and
            a control end;
        a second transistor including:
            a first end;
            a second end coupled to the control end of the first transistor; and
            a control end coupled to the control end of the first transistor;
        a third transistor including:
            a first end;
            a second end coupled to the second end of the first transistor; and
            a control end coupled to the second end of the first transistor;
        a fourth transistor including:
            a first end coupled to the first end of the third transistor;
            a second end coupled to the control end of the first transistor; and
            a control end coupled to the second end of the first transistor;
        a fifth transistor including:
            a first end coupled to the first end of the third transistor;
            a second end coupled to the second end of the first charge-to-voltage converter; and
            a control end coupled to the second end of the first transistor; and
        a voltage source coupled between the anode of the photodiode and the first end of the second transistor to provide the constant bias voltage.

6. The imaging system of claim 1, wherein the each pixel circuit further comprises:
    a first switch to selectively couple the second end of the first charge-to-voltage converter to a data line; and
    a second switch to reset the first charge-to-voltage converter.

7. The imaging system of claim 1, further comprising:
    a first processing circuit configured to:
        acquire a first signal sample by reading an output voltage generated by a charge-to-voltage converter in a first pixel circuit among the plurality of the pixels circuits before resetting the charge-to-voltage converter in the first pixel circuit; and
        acquire a second signal sample by reading an output voltage generated by a charge-to-voltage converter in a second pixel circuit among the plurality of the pixels circuits before resetting the charge-to-voltage converter in the second pixel circuit; and
    a second processing circuit configured to:
        acquire a first reset sample by reading the output voltage generated by the charge-to-voltage converter in the first pixel circuit after resetting the charge-to-voltage converter in the first pixel circuit; and
        acquire a second reset sample by reading the output voltage generated by the charge-to-voltage converter in the second pixel circuit after resetting the chargeto-voltage converter in the second pixel circuit, wherein:
the first pixel circuit is arranged in an $m^{th}$ row and an $n^{th}$ column of the pixel array, m and n being positive integers; and
the second pixel circuit is arranged in an $(m+1)^{th}$ row and the $n^{th}$ column of the pixel array.

8. The imaging system of claim 7, wherein the first reset sample and the second signal sample are acquired simultaneously.

9. The imaging system of claim 1, wherein the first charge-to-voltage converter is a linear plate capacitor.

10. The imaging system of claim 1, wherein the constant bias voltage is zero.

11. An imaging method, comprising:
maintaining a voltage established across a photodiode at a constant value to drain charges generated by the photodiode in response to light or radiation during a reset period, an image acquisition period, or a readout period;
accumulating the charges drained from the photodiode in a first charge-to-voltage converter and converting the accumulated charges into a corresponding output voltage during the image acquisition period;
acquiring a signal sample by reading the output voltage during the readout period subsequent to the image acquisition period, wherein the signal sample voltage is associated with the charges accumulated in the first charge-to-voltage converter during the image acquisition period.

12. The imaging method of claim 11, further comprising:
resetting the first charge-to-voltage converter during the reset period and prior to the image acquisition period;
acquiring a reset sample associated with charges accumulated in the first charge-to-voltage converter during the reset period; and
generating a video signal associated the charges generated by the photodiode during the image acquisition period based on the signal sample voltage and the reset sample voltage.

13. The imaging method of claim 12, wherein the video signal is associated with the signal sample subtracted by the reset sample.

14. The imaging method of claim 11, further comprising:
operating a biasing circuit using a first bias current to maintain the voltage established across the photodiode at the constant value during the image acquisition period; and
operating the biasing circuit using a second bias current to maintain the voltage established across the photodiode at the constant value during the reset period or the readout period, wherein the first bias current is less than the second bias current.

* * * * *